(12) United States Patent
Au et al.

(10) Patent No.: US 9,009,952 B2
(45) Date of Patent: Apr. 21, 2015

(54) APPARATUS FOR ASSEMBLING A LENS MODULE AND AN IMAGE SENSOR TO FORM A CAMERA MODULE, AND A METHOD OF ASSEMBLING THE SAME

(75) Inventors: Po Lam Au, Tseung Kwan O (HK); Ming Lok Yeung, New Territories (HK); Tung Yeung Tsoi, Mong Kok (HK); Yu Luen Suen, Sham Shui Po (HK)

(73) Assignee: ASM Technology Singapore Pte. Ltd., Singapore (SG)

( * ) Notice: Subject to any disclaimer, the term of this patent is extended or adjusted under 35 U.S.C. 154(b) by 511 days.

(21) Appl. No.: 13/220,330

(22) Filed: Aug. 29, 2011

(65) Prior Publication Data

US 2013/0047396 A1 Feb. 28, 2013

(51) Int. Cl.
*B23P 21/00* (2006.01)
*B23Q 17/00* (2006.01)
*B23Q 3/00* (2006.01)
*B23Q 17/22* (2006.01)

(52) U.S. Cl.
CPC ...................................... *B23Q 17/22* (2013.01)

(58) Field of Classification Search
USPC .................. 29/720, 721, 709, 759, 760, 705, 29/407.01, 407.04, 407.09, 407.1, 464
See application file for complete search history.

(56) References Cited

U.S. PATENT DOCUMENTS

| | | | | |
|---|---|---|---|---|
| 5,453,606 A | * | 9/1995 | Hojo | 250/201.1 |
| 5,519,495 A | * | 5/1996 | Kawaguchi | 356/615 |
| 6,079,098 A | * | 6/2000 | Soellner et al. | 29/832 |
| 7,016,121 B2 | * | 3/2006 | Kawanabe et al. | 359/694 |
| 7,193,728 B2 | * | 3/2007 | Ichikawa et al. | 356/614 |
| 7,352,403 B2 | * | 4/2008 | Liao et al. | 348/350 |
| 7,391,458 B2 | * | 6/2008 | Sakamoto | 348/340 |
| 7,587,803 B2 | * | 9/2009 | Montfort et al. | 29/407.1 |
| 7,707,712 B2 | * | 5/2010 | Kim | 29/832 |
| 7,845,058 B2 | * | 12/2010 | Chen | 29/407.01 |
| 7,911,720 B2 | * | 3/2011 | Weng et al. | 359/819 |
| 7,926,159 B2 | * | 4/2011 | Tsai | 29/407.04 |
| 8,011,087 B2 | * | 9/2011 | Hsiao | 29/832 |
| 8,098,284 B2 | * | 1/2012 | Ushijima et al. | 348/188 |
| 8,417,106 B2 | * | 4/2013 | Kanai | 396/128 |
| 8,493,455 B2 | * | 7/2013 | Ko et al. | 348/208.99 |
| 8,711,277 B2 | * | 4/2014 | Apel | 348/360 |
| 2004/0027586 A1 | * | 2/2004 | Ichikawa et al. | 356/614 |
| 2005/0007482 A1 | * | 1/2005 | Liao et al. | 348/335 |
| 2005/0105193 A1 | * | 5/2005 | Kawanabe et al. | 359/694 |

(Continued)

FOREIGN PATENT DOCUMENTS

| | | | | |
|---|---|---|---|---|
| CN | 101726986 A | * | 6/2010 | G03B 43/00 |
| KR | 100651836 B1 | * | 11/2006 | H04N 5/225 |

(Continued)

*Primary Examiner* — Essama Omgba
(74) *Attorney, Agent, or Firm* — Sughrue Mion, PLLC (57) ABSTRACT

An apparatus for assembling a lens module and an image sensor to form a camera module. The apparatus comprises i) a positioning system for adjusting a relative arrangement between the lens module and the image sensor; and ii) an inspection system operative to view fiducials of the lens modules and the image sensor. In particular, the positioning system is configured to align the lens module and the image sensor based on a relative alignment of the respective fiducials of the lens module and the image sensor as viewed by the inspection system. A method of assembling a lens module and an image sensor to form a camera module is also disclosed.

12 Claims, 11 Drawing Sheets

(56) References Cited

U.S. PATENT DOCUMENTS

| | | | |
|---|---|---|---|
| 2005/0237418 A1* | 10/2005 | Sakamoto | 348/340 |
| 2006/0042064 A1* | 3/2006 | Montfort et al. | 29/407.1 |
| 2007/0159703 A1* | 7/2007 | Apel et al. | 359/819 |
| 2008/0201939 A1* | 8/2008 | Tsai | 29/722 |
| 2008/0307626 A1* | 12/2008 | Chen | 29/407.1 |
| 2009/0128684 A1* | 5/2009 | Apel | 348/360 |
| 2009/0183365 A1* | 7/2009 | Hsiao | 29/836 |
| 2010/0007784 A1* | 1/2010 | Haneda | 348/347 |
| 2010/0085474 A1* | 4/2010 | Morita | 348/374 |
| 2010/0118157 A1* | 5/2010 | Ushijima et al. | 348/208.99 |
| 2010/0205793 A1* | 8/2010 | Ko et al. | 29/281.5 |
| 2011/0013898 A1* | 1/2011 | Kanai | 396/114 |
| 2011/0026145 A1* | 2/2011 | Weng et al. | 359/819 |
| 2012/0307077 A1* | 12/2012 | Hsin | 348/187 |
| 2013/0222679 A1* | 8/2013 | Chen et al. | 348/360 |
| 2013/0235259 A1* | 9/2013 | Dharmatilleke | 348/373 |
| 2013/0242182 A1* | 9/2013 | Rudmann et al. | 348/374 |
| 2013/0271649 A1* | 10/2013 | Halliday | 348/374 |
| 2013/0308047 A1* | 11/2013 | Chen et al. | 348/374 |
| 2013/0333207 A1* | 12/2013 | Lee et al. | 29/739 |
| 2013/0333843 A1* | 12/2013 | Kim et al. | 156/362 |
| 2014/0002674 A1* | 1/2014 | Duparre et al. | 348/187 |

FOREIGN PATENT DOCUMENTS

| | | | | |
|---|---|---|---|---|
| KR | 651836 B1 | * | 12/2006 | H04N 5/225 |
| KR | 652815 B1 | * | 12/2006 | H04N 5/225 |
| TW | 200831973 A | * | 8/2008 | C08L 83/04 |

* cited by examiner

APPARATUS FOR ASSEMBLING A LENS MODULE AND AN IMAGE SENSOR TO FORM A CAMERA MODULE, AND A METHOD OF ASSEMBLING THE SAME

FIELD OF THIS INVENTION

This invention relates to an apparatus for assembling a lens module and an image sensor to form a camera module, which is particularly but not exclusively for use in mobile devices such as cell phones, tablets, and laptop computers. The invention also relates to a method of assembling a lens module with an image sensor to form a camera module.

BACKGROUND OF THE INVENTION

Operational requirements of camera modules for use in mobile devices such as cell phones, tablets, and laptop computers are rapidly advancing in respect of sharper image resolutions and more sophisticated auto-focus capabilities. At the same time, dimensions of camera modules are also becoming smaller to meet consumer demand. Consequently, the operational performance of such camera modules is becoming extremely sensitive to the relative arrangement of the lens module and the image sensor—that is, a slight misalignment of the lens module with respect to the image sensor might result in a significant drop in the operational performance of these camera modules. Accordingly, conventional open-loop pick-and-place devices can no longer provide the required alignment accuracy between the lens module and image sensor to meet the desired operational performance of these camera modules.

In addition, the assembly of the camera modules does not take into consideration the respective optical characteristics of the lens module and the image sensor. Accordingly, the assembled camera modules may differ with regard to operational performance since the differences in optical characteristics among the various components of the camera modules are ignored.

Thus, it is an object of this invention to seek to address the above problems encountered during the assembly of these camera modules.

SUMMARY OF THE INVENTION

A first aspect of the invention is an apparatus for assembling a lens module and an image sensor to form a camera module. The apparatus comprises i) a positioning system for adjusting a relative arrangement between the lens module and the image sensor; and ii) an inspection system operative to view fiducials of the lens module and the image sensor. In particular, the positioning system is configured to align the lens module and the image sensor based on a relative alignment of the respective fiducials of the lens module and the image sensor as viewed by the inspection system.

By providing the inspection system operative to view fiducials of both the lens module and the image sensor, the apparatus ensures an accurate alignment of the lens module with respect to the image sensor. Accordingly, high operational performance of the camera module may advantageously be assured, for example, in respect of its image resolution and auto-focus capabilities.

Some preferred but optional features of the apparatus are defined in the dependent claims.

For instance, the positioning system may comprise a gripper for gripping the lens module. In addition, the gripper may be configured to actuate the lens module in a six degrees of motion defined by translational motion along each of three orthogonal axes in a three-dimensional space and rotational motion about each of the three orthogonal axes. This allows the relative position between the lens module and the image sensor to be precisely adjusted through any one or more of the six degrees of motion, and advantageously provides an accurate alignment between the lens module and the image sensor to form the camera module.

Optionally, the gripper may be configured to actuate the lens module to rotate relative to the image sensor about an axis defined by both the lens module and the image sensor, to align the respective fiducials of the lens module and the image sensor.

Further, the apparatus may include an image testing device and a test chart for use in testing optical characteristics of the lens module and the image sensor. In particular, the image testing device may comprise a magnification lens assembly for converging images of the test chart onto the image sensor. By providing the magnification lens assembly, the test chart may advantageously be miniaturised to occupy a smaller space within the apparatus.

A second aspect of the invention is a method of assembling a lens module and an image sensor to form a camera module. Specifically, the method comprises the steps of: i) viewing fiducials of the lens module and the image sensor; and ii) aligning the lens module and the image sensor based on a relative alignment of the respective fiducials of the lens module and the image sensor.

By obtaining fiducials of both the lens module and the image sensor, the apparatus ensures an accurate alignment of the lens module with respect to the image sensor. Advantageously, high operational performance of the camera module is assured in respect of, for example, its image resolution and auto-focus capabilities.

Some preferred but optional steps are defined in the dependent claims.

For instance, the step of viewing fiducials of the lens module and the image sensor may comprise—viewing the fiducials on a surface of the lens module from a first direction using a first inspection device, and viewing the fiducials on a surface of the image sensor from a second direction using a second inspection device, wherein the second direction is opposite to the first direction.

In addition, the method of assembling a lens module and an image sensor—wherein the lens module is gripped by a gripper—may further include the step of actuating the gripper in any one of a six degrees of motion defined by translational motion along each of three orthogonal axes in a three-dimensional space and rotational motion about each of the three orthogonal axes. Moreover, the method may further comprise active alignment of the lens module with the image sensor, which includes the steps of i) obtaining a plurality of images of a test chart using the image sensor at different heights of the lens module relative to the image sensor; ii) analysing the plurality of images of the test chart in respect of their clarity; and iii) actuating the gripper in one or more of the six degrees of motion to move the lens module relative to the image sensor to an optimal position that provides higher consistency of image clarity among corresponding sections of the plurality of images. In addition, the active alignment step may further comprise the step of aligning a centre of the image sensor with a centre of the test chart image.

Optionally, the method of assembling a lens module and an image sensor—wherein the lens module comprises a lens and a lens holder, the lens module being supported by a turn head operative to rotate the lens relative to both the lens holder and the image sensor—may further include an active alignment of the lens with the image sensor, which includes the steps of: i) obtaining a plurality of images of a test chart using the image sensor at different angular displacements of the lens relative to the image sensor; ii) analysing the plurality of images of the test chart in respect of their clarity; and iii) rotating the turn head to move the lens until the lens is arranged at a particular angular displacement relative to the lens holder and the image sensor, wherein the particular angular displacement of the lens relative to the lens holder and the image sensor is based on the clarity of the plurality of images as analysed.

BRIEF DESCRIPTION OF THE DRAWINGS

Preferred embodiments of the invention will now be described, by way of example only, with reference to the accompanying drawings in which:

FIG. 3 shows an alignment device adapted for holding the lens module of FIG. 2a;

DETAILED DESCRIPTION OF THE PREFERRED EMBODIMENTS

Figure 1:
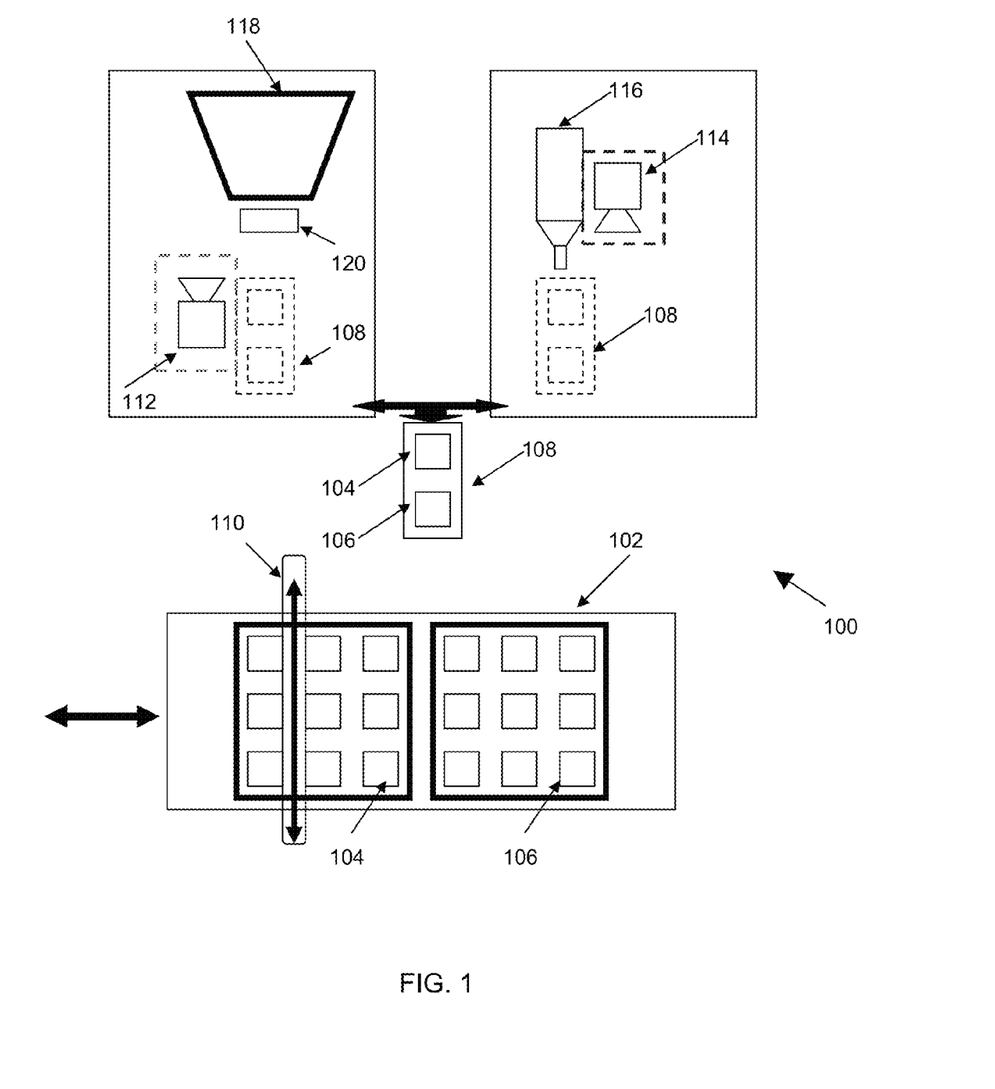
FIG. 1 is a schematic view of an apparatus for aligning a lens module with an image sensor according to a first embodiment of the invention.

FIG. 1 is a schematic view of an apparatus 100 according to a first embodiment of the invention. The apparatus 100 comprises: i) an on/offloading device 102 configured to load lens modules 104 and image sensors 106 for assembly to become camera modules; ii) a positioning system (shown in FIG. 1 as a unit transporter 108 on which an image sensor 106 is mountable and an active alignment device 120 having a mechanism for gripping a lens module 104) configured to position the lens module 104 and the image sensor 106 for assembly; iii) a pick arm 110 configured to transfer the lens module 104 and the image sensor 106 to the unit transporter 108; v) a first inspection device (shown in FIG. 1 as an uplook inspection device 112) positioned in a first direction for locating and viewing fiducials on a surface of the lens module 104; vi) a second inspection device (shown in FIG. 1 as a downlook inspection device 114) positioned in a second direction opposite to the first direction for locating and viewing fiducials of a surface of the image sensor 106; vii) a dispenser 116 configured to dispense UV glue onto the image sensor 106; and viii) an image testing device 118 having a plurality of optical components and a test chart.

The uplook inspection device 112, the image testing device 118, and the active alignment device 120 are arranged in close proximity to one another within the apparatus 100. Similarly, the downlook inspection device 114 and the dispenser 116 are also arranged in close proximity to each other within the apparatus 100. Such an internal construction of the apparatus 100 reduces a travel path of the unit transporter 108 that is necessary to perform the various operations of the apparatus 100 to assemble the lens modules 104 and the image sensor 106. By reducing the travel path of the unit transporter 108, throughput potential of the apparatus 100 may be advantageously increased.

Figure 2A:
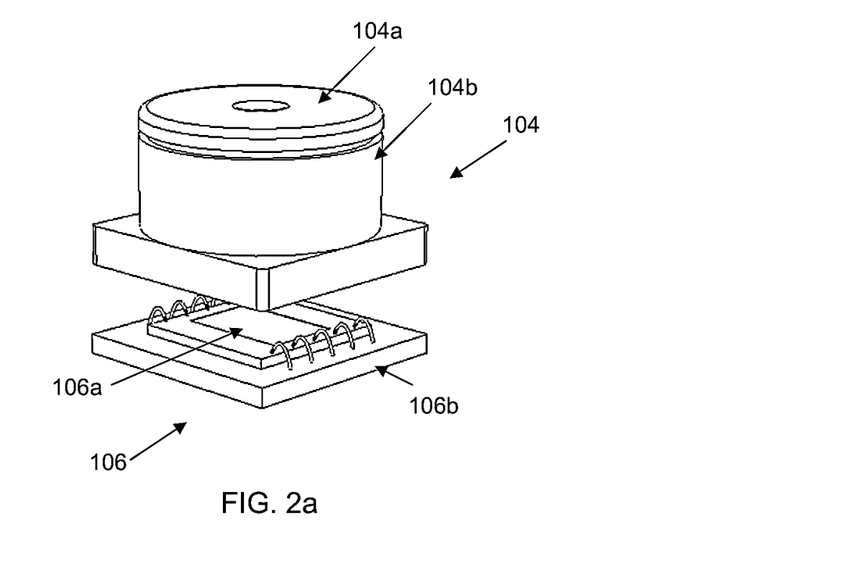
FIG. 2a shows a relative arrangement of the lens module and the image sensor before assembly.

FIG. 2a shows one of the lens modules 104 and one of the image sensors 106 before they are assembled to form a camera module. In particular, the lens module 104 is made up of a lens 104a and a lens holder 104b for securing the lens 104a in position. The image sensor 106 is made up of an imaging chip 106a and a substrate 106b on which the imaging chip 106a is mounted.

Figure 2B:
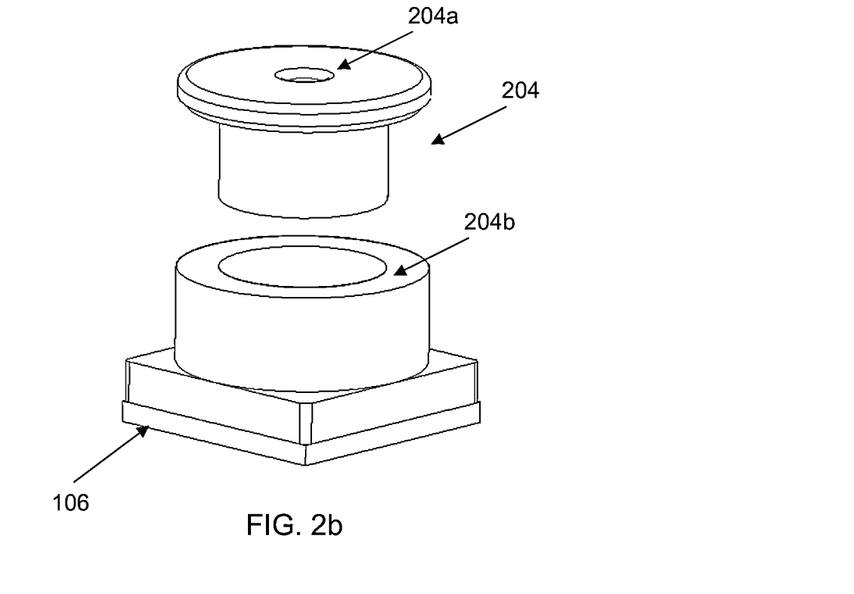
FIG. 2b shows a relative arrangement of a different configuration of the lens module and the image sensor before assembly.

FIG. 2b shows a lens module 204 having a different configuration from the lens module 104 of FIG. 2a. Like the lens module 104 of FIG. 2a, the lens module 204 of FIG. 2b also comprises a lens 204a and a lens holder 204b for securing the lens 204a. However, unlike the lens module 104 of FIG. 2a in which the lens 104a is fixed within the lens holder 104b, the lens 204a of the lens module 204 shown in FIG. 2a is rotatably movable within the lens holder 204b. In particular, the lens 204a and the lens holder 204b include corresponding mating threads so that the lens 204a can be screwed into the lens holder 204b. By adjusting the relative angular arrangement between the lens 204a and the lens holder 204b, optical characteristics of the assembled camera module may be optimised.

Figure 3:
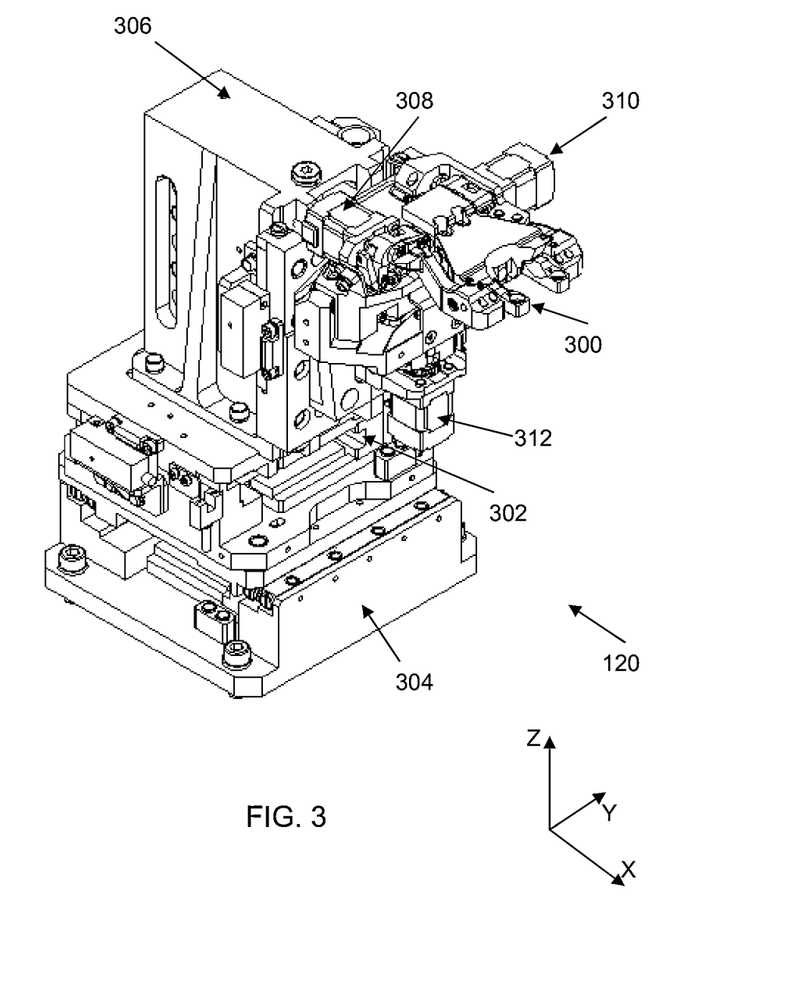

FIG. 3 is an isometric view of the active alignment device 120. Specifically, the active alignment device 120 has a gripper 300 for gripping a lens module 104. The active alignment device 120 also includes various motors for actuating the gripper 300 to move independently with reference to three orthogonal axes in a three-dimensional space, in order to achieve motion of up to a six degrees of freedom. The three orthogonal axes may be respectively defined by the X, Y, and Z axes, and accordingly, the six degrees of motion includes linear displacements along each of those X, Y, and Z axes, as well as rotational displacements about each of those X, Y, and Z axes. To actuate the gripper 300 in the six degree-of-motion, the motors of the active alignment device 120 comprise: i) a linear X-motor 302 for actuating linear motion along the X-axis; ii) a linear Y-motor 304 for actuating linear motion along the Y-axis; iii) a linear Z-motor 306 for actuating linear motion along the Z-axis; iv) a roll motor 308 for actuating rotational motion about the X-axis; v) a pitch motor 310 for actuating rotational motion about the Y-axis; and vi) a yaw motor 312 for actuating rotational motion about the Z-axis.

Figure 4:
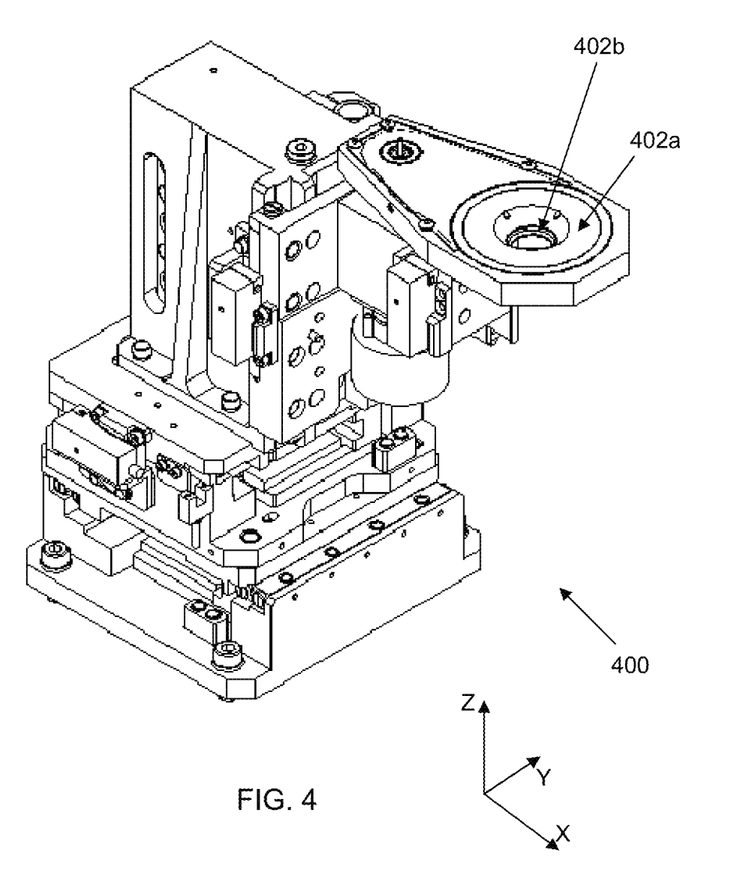
FIG. 4 shows a different configuration of the alignment device adapted for holding the lens module of FIG. 2b.

FIG. 4 shows an active alignment device 400 having a configuration which is different from that of the active alignment device 120 of FIG. 3. In particular, this active alignment device 400 has a rotatable turn head 402a. Thus, the active alignment device 400 is suitable for use with the lens module 204 of FIG. 2b. Specifically, the lens 204a is inserted into the rotatable turn head 402a whilst the lens holder 204b is fixed within a cavity 402b of the active alignment device 400. By rotating the turn head 402a about a common axis as defined by both the lens module 204 and the image sensor 106, the lens 204a can accordingly be screwed into the lens holder 204b via their mating screw threads in order to obtain an optimal angular arrangement.

Figure 5:
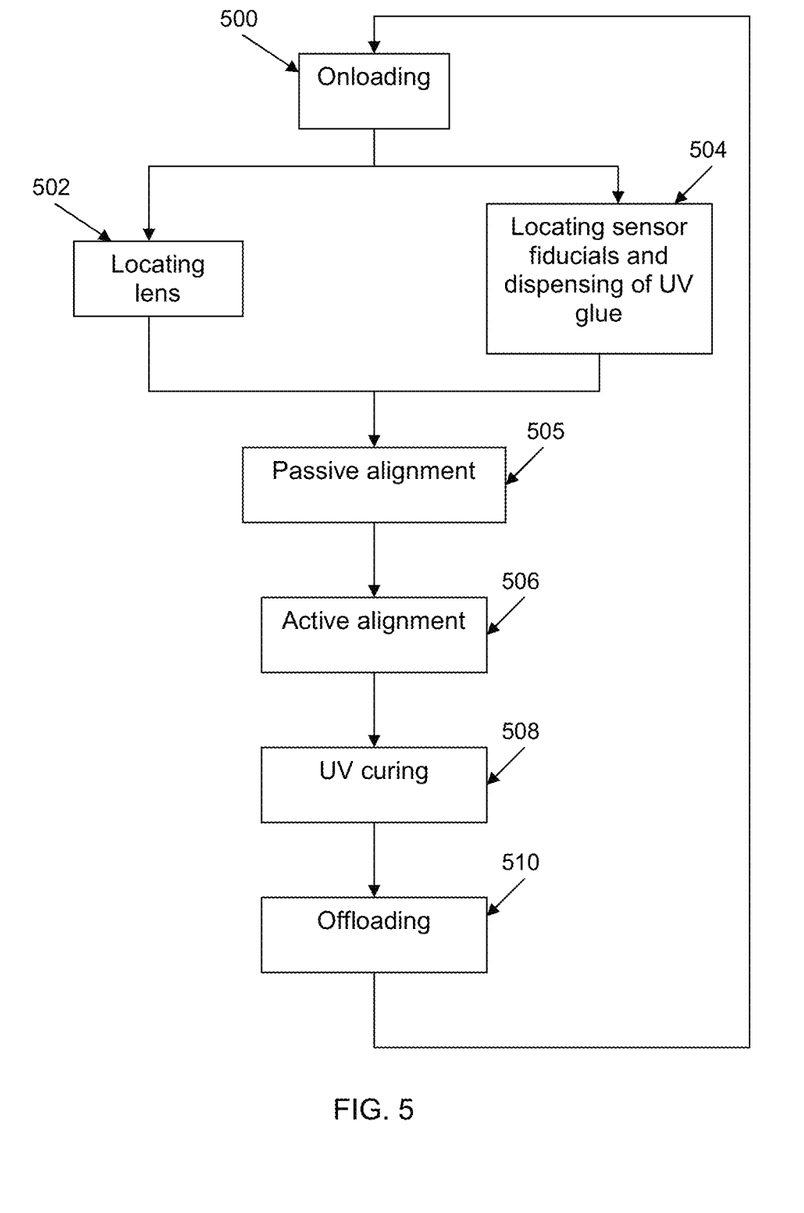
FIG. 5 is a flow chart of an overall operation of the apparatus of FIG. 1.

FIG. 5 is a flow chart of an overall assembly process of the apparatus 100. A typical assembly process cycle first begins with the step 500 of onloading the lens modules 104 and the image sensors 106 onto the on/offloading device 102. In this onloading step 500, the pick arm 110 sequentially transfers one of the lens modules 104 and one of the image sensors 106 onto the unit transporter 108.

After the onloading step 500 has been completed, the unit transporter 108 moves to the active alignment device 120 so that the lens module 104 can be picked up by the active alignment device 120 and the step 502 of locating fiducials of the lens module 104 is performed. The fiducials of the lens module 104 are located on a surface at the base of the lens module 104, and therefore, the uplook inspection device 112 is activated to capture an image of the base of the lens module 104.

Figure 6A:
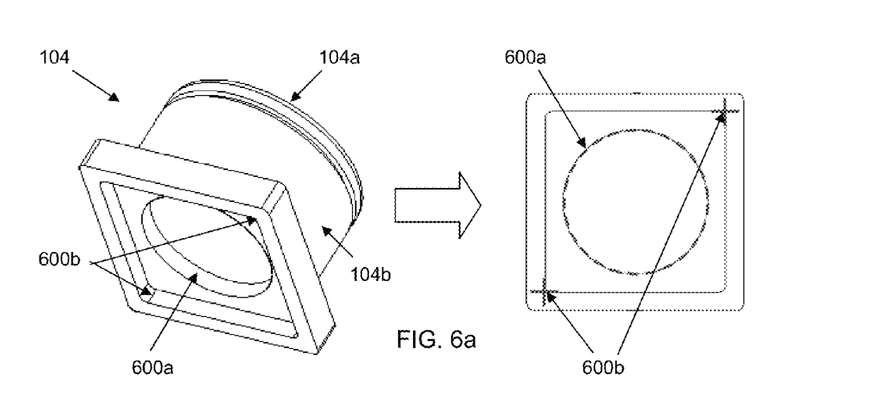
FIG. 6a and FIG. 6b show the fiducials of the lens module of FIG. 2a and the fiducials of the image module respectively.

FIG. 6a illustrates the fiducials of the lens module 104. In particular, these fiducials are defined by a lens aperture 600a through which light passes and by corners 600b at the base of the lens holder 104b. Positional information relating to the fiducials of the lens module 104 is then stored by the apparatus 100.

After the lens module 104 has been picked up by the gripper 300, the unit transporter 108 carries the image sensor 106 to the downlook inspection device 114 before the steps 504 of locating fiducials of the image sensor 106 and dispensing the UV glue on the image sensor 106 are performed. Since the fiducials of the image sensor 106 are located on a surface at the top of the image sensor 106, the downlook inspection device 114 is activated to capture an image of the top of the image sensor 106.

Referring to FIG. 5, it is seen that the steps 504 are performed almost in parallel with the step 502 of locating the fiducials of the lens module 104. This maximises the operational efficiency of the apparatus 100. Similarly, positional information relating to the fiducials of the image sensor 106 is stored by the apparatus 100.

Figure 6B:
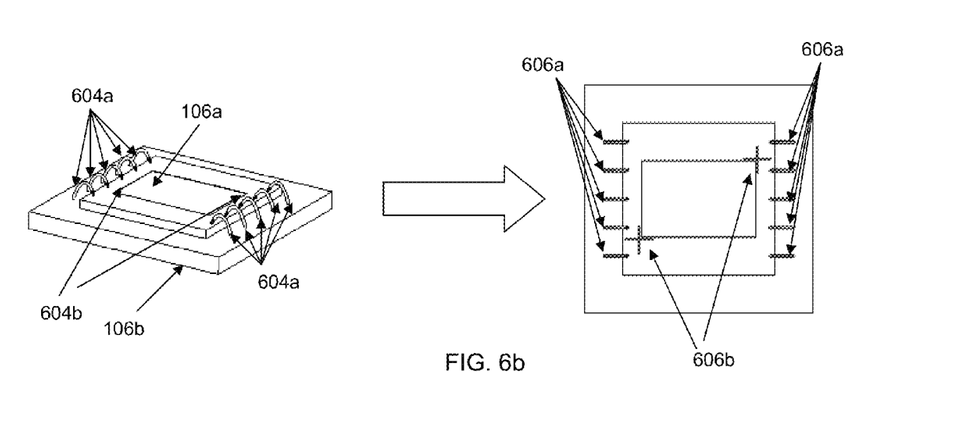

FIG. 6b illustrates the fiducials of the image sensor 106. In particular, these fiducials may be defined by multiple wire bonds 606a that electrically connect the imaging chip 106a to the substrate 106b. Additionally, the fiducials of the image sensor 106 may include corners 606b of the imaging chip 106a. By relying on the positional information relating to these fiducials of the image sensor 106, the dispenser 116 can then dispense the UV glue accurately onto the image sensor. In particular, the unit transporter 108 moves along any or both of the X and Y axes to position the image sensor 106 accurately before the UV glue is dispensed.

After the UV glue has been accurately dispensed onto the image sensor 106, the unit transporter 108 carries the image sensor 106 back to the active alignment device 120 to perform the step 505 of passive alignment of the lens module 104 with the image sensor 106.

The step 505 of passive alignment of the lens module 104 with the image sensor 106 is performed based on the respective positional information obtained in the earlier steps 502, 504 using the fiducials of both the lens module 104 and the image sensor 106. Additionally, the gripper 300 is actuated to define six degrees of motion with reference to the X, Y, and Z orthogonal axes to align the lens module 104 with the image sensor 106. By providing both the uplook inspection device 112 and the downlook inspection device 114 to obtain the fiducials of the lens module 104 and the image sensor 106 respectively, the apparatus 100 can therefore align the lens module 104 accurately with respect to the image sensor 106.

However, such a passive alignment method between the lens module 104 and the image sensor 106 relies on a pre-stored algorithm of the apparatus 100, and does not therefore take into account any variable optical characteristics of the lens module 104 and the image sensor 106. In order to take into account those variable optical characteristics of the lens module 104 and the image sensor 106, test images should be captured using the image sensor 106 and the lens module 104 before they are finally assembled to form the camera module.

Figure 7:
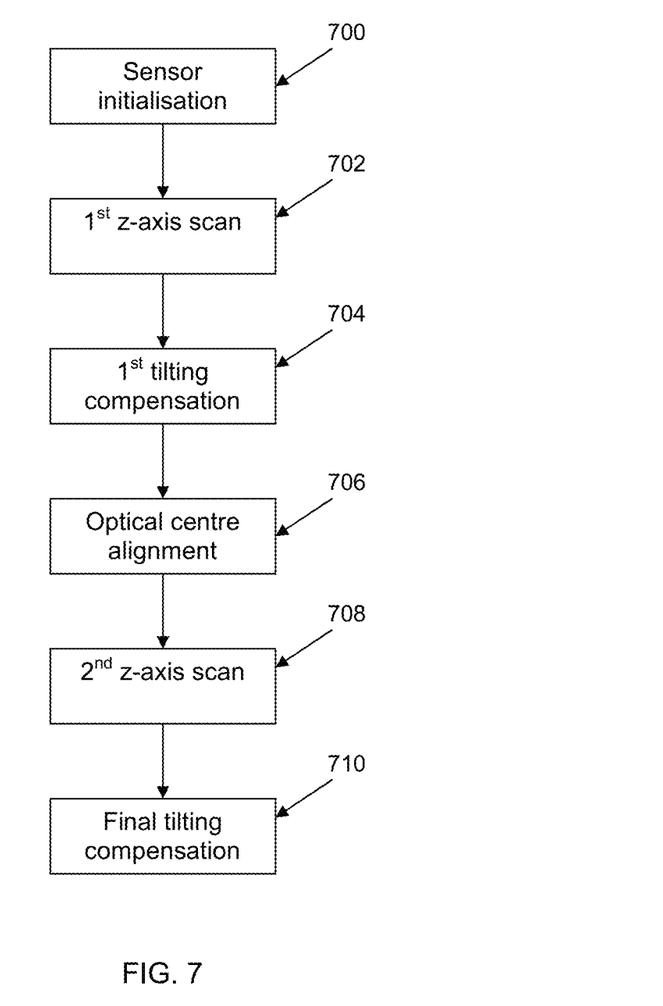
FIG. 7 is a flow chart of an active alignment operation of the apparatus of FIG. 1.

FIG. 7 is a flow chart of the steps involved in the active alignment of the lens module 104 with the image sensor 106. The active alignment process begins with the step 700 of initialising the image sensor 106. Specifically, the image sensor 106 is first powered and initialised by the apparatus 100 before performing the step of Z-axis scanning 702.

Figure 8:
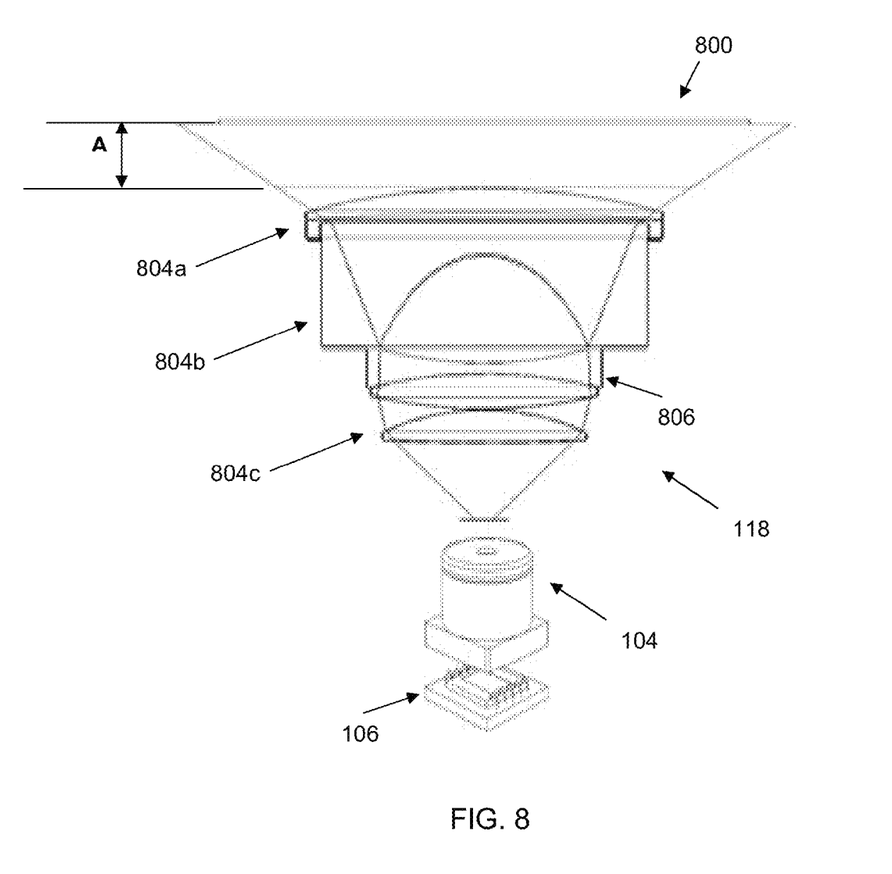
FIG. 8 shows an image testing device.

FIG. 8 shows the relative arrangement of the image testing device 118 and the assembly of the lens module 104 and image sensor 106 during the step 702 of Z-axis scanning. In particular, the image testing device 118 includes a test chart 800, as well as an image-converging device. Specifically, the image-converging device is a type of magnification lens assembly, comprising a stack of singlet lenses 804a-c and doublets lens 806. In particular, the stack of singlet lens 804a-c and the doublet lens 806 are operative to converge an image of the test chart 800 onto the image sensor 106.

Figure 9:
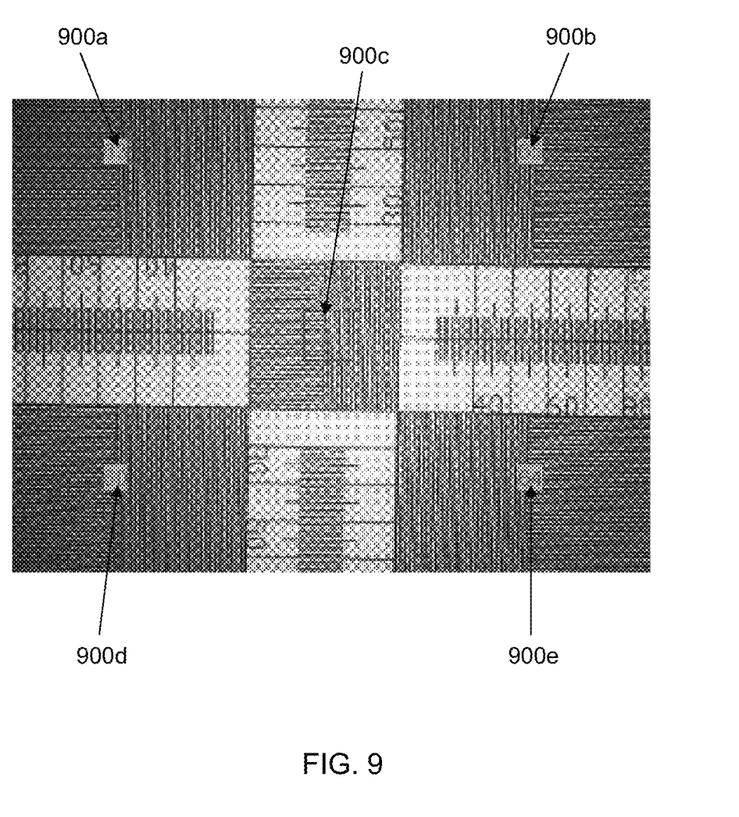
FIG. 9 shows an exemplary test chart usable in the image testing device of FIG. 8.

FIG. 9 shows the test chart 800 used in the image testing device 118. Specifically, the test chart 800 includes five regions of interest 900a-e. Conventional test charts for testing the optical properties of an assembled camera module generally have length and width dimensions of about 2 metres (m) by 2 metres (m). Consequently, the image testing device 118 has to be large enough to house a conventional test chart. Therefore, an apparatus which relies on a conventional test chart typically has dimensions of about 2.5 m by 2.5 m by 2.5 m.

By contrast, the test chart 800 has smaller length and width dimensions of about 15 centimetres (cm) by 15 centimetres (cm). Preferably, the length and width dimensions of the test chart 800 are not more than 15 cm. Miniaturisation of the test chart 800—as compared to its conventional counterparts—is achieved by the stack of singlet lenses 804a-c and the doublet lens 806. Moreover, such a configuration of the image testing device 118 advantageously provides better image quality as well as lower image distortion.

It should be appreciated that the imaging distance 'A' between the test chart 800 and the image-converging device—as shown in FIG. 8—may be 0.4 m, 0.6 m, 1 m, 2 m, or 5 m.

Further, the step 702 of Z-axis scanning is performed at different Z-levels of the lens module 104 relative to the image sensor 106. The test chart images captured by the image sensor 106 at different Z-levels are then subject to image analysis by the apparatus 100. Specifically, the apparatus 100 performs a pattern recognition process to identify respective sections of each captured image corresponding to the five regions of interest 900a-e, and subsequently determines the clarity of each of the identified areas of the respective image.

Figure 10A:
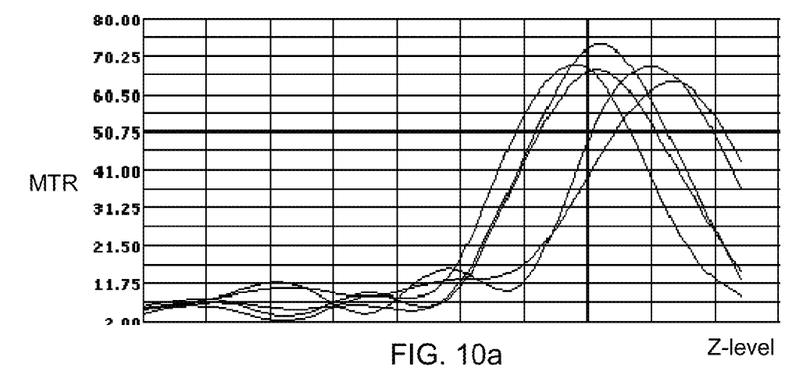
FIG. 10a, FIG. 10b, and FIG. 10c are graphs depicting clarity of the images as captured by the image sensor.

FIG. 10a shows five separate graphs each depicting the relation between a clarity index (e.g. a modular transfer function MTF or a spatial frequency response SFR) against the various Z-levels of the lens module 104 relative to the image sensor 106. After the step 702 of Z-axis scanning has been completed, the apparatus 100 then performs the step 704 of tilting compensation of the gripper 300.

The step 704 of tilting compensation of the gripper 300 includes the apparatus 100 executing an image alignment algorithm by analysing the clarity of the respective sections of the images obtained by the apparatus 100 at the different Z-levels. In particular, the apparatus 100 actuates the gripper 300 to tilt the lens module 104 until the highest clarity indices of all the respective sections of the images are obtained at the same Z-level. Specifically, the image alignment algorithm compares the clarity of respective sections of the obtained images against a predetermined database, which includes a ratio list of an angle to peak clarity relative to each of the X, Y, and Z axes for the various regions of interest 900a-e of the test chart 800. This predetermined database is obtained during the set-up of the apparatus 100 by performing Z-scanning three times. By comparing the data derived at the step 702 of Z-axis scanning with this predetermined database, the apparatus 100 can accordingly actuate the gripper 300 to move to an optimal position that provides higher consistency of image clarity among corresponding sections of the plurality of images.

More specifically, the apparatus 100 actuates the gripper 300 to move the lens module 104 along any of the X, Y, and Z axes, and/or to rotate the lens module 104 about any of the X, Y and Z axes until the lens module 104 reaches the optimal position. Nevertheless, it should be noted that it is not necessary to rotate the lens module 104 about the Z-axis as the angular arrangement of the lens module 104 relative to the image sensor 106 has already been undertaken in the earlier step 505 of passive alignment between the lens module 104 and the image sensor 106. Further, it is also not necessary to move the lens module 104 along the Z-axis as another iteration of Z-axis scanning will subsequently be performed.

Typically, the clarity level provided by a lens module decreases from its lens centre to its outer lens periphery. Accordingly, the step of aligning the optical centre of a lens module should preferably be performed to ensure that the centre of an image sensor has the highest clarity. Thus, after the step of Z-axis scanning 702 is completed, the apparatus 100 performs the step 706 of aligning the optical centre before performing another iteration of the Z-axis scanning 708. Specifically, an optical diffuser is arranged between the lens module 104 and the image sensor 106 for evenly distributing light from a light source to produce a diffuser background light. An image of the diffuser background light that is subsequently taken by the image sensor 106 is binarised to form a light circle. After locating the optical centre of the light circle, the apparatus 100 actuates the unit transporter 108 to ensure that the centre of the image sensor 106 is aligned with the optical centre of the diffuser background light.

FIG. 10b again shows the various graphs depicting the relation of the clarity index of the image sections corresponding to the various regions of interest 900a-e of the test chart 800 against the various Z-levels of the lens module 104 after the gripper 300 has been moved to the optimal position as identified by the image alignment algorithm.

Figure 10B:
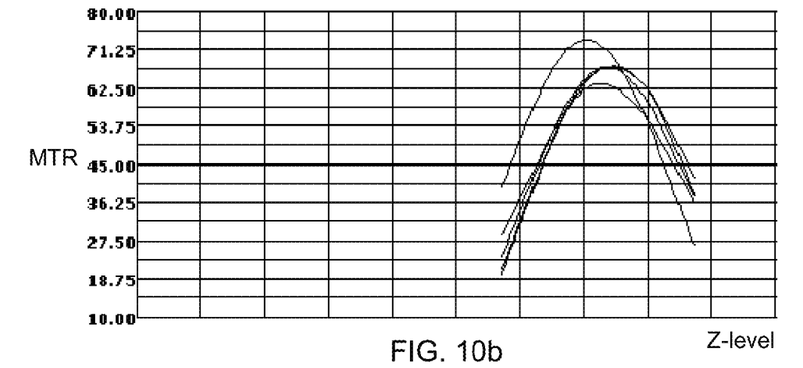

It can be seen from the graphs of FIG. 10b that the clarity index of the image sections corresponding to the various regions of interest 900a-e is more consistent at the different Z-levels, compared with the graphs of FIG. 10a. Once again, the apparatus 100 performs the step 710 of tilting compensation of the gripper 300 by comparing the information of FIG. 10b against the predetermined database to further optimise the alignment of the lens module 104 relative to the image sensor 106. The apparatus 100 then actuates the gripper 300 to tilt the lens module 104 relative to any of the X, Y and Z axes until the lens module 104 reaches an improved optimal position as identified by the image alignment algorithm. In particular, the gripper 300 moves to the Z-level that provides the highest clarity indices of the sections of the images corresponding to all the regions of interest 900a-e of the test chart 800. This completes the active alignment process.

Figure 10C:
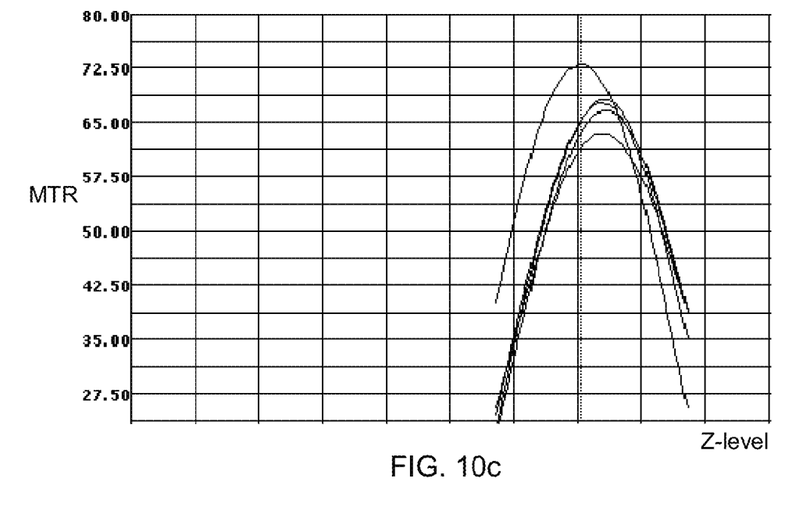

FIG. 10c shows various graphs based on the images taken after the lens module 104 has been optimally arranged twice. It can be seen that the clarity index of the image sections corresponding to the various regions of interest 900a-e of the test chart 800 is even more consistent at the different Z-levels, compared with the graphs of FIG. 10b. This means that the quality of different areas of an image taken after the lens module 104 has been optimally aligned twice is more consistent than that taken after the lens module has only been optimally aligned once. Nonetheless, it should be appreciated that the active alignment process may include either a single iteration or multiple iterations of Z-axis scanning and tilting compensation, instead of having two iterations as shown in FIG. 7.

Another method of performing the active alignment process is through the use of the active alignment device 400 of FIG. 4 to align the lens 204a illustrated in FIG. 2b with the image sensor 106. In particular, the use of the active alignment device 400 involves the image sensor 106 capturing the various test chart images at different angles of the lens 204a relative to the lens holder 204b as the lens 204a is screwed into the lens holder 204b. The test chart images captured by the image sensor 106 at the various angles are then subject to the same process of image analysis as described above. That is, the apparatus 100 performs a similar pattern recognition process to identify respective sections of each captured image corresponding to the five regions of interest 900a-e of the test chart 800, and subsequently determines the different clarity indices of each of the identified areas of the respective image against the corresponding angular displacements between the lens 204a and the image sensor 106. Five separate graphs similar to those shown in FIG. 10a are then plotted, each depicting the relation between a clarity index (e.g. the modular transfer function MTF or the spatial frequency response SFR) against the relative angular arrangement between the lens 204a and the image sensor 106. The active alignment device 400 is then actuated to rotate its turn head 402 to move the lens 204a whilst the lens holder 204b is fixed in position within the cavity 402b of the active alignment device 400, until the lens 204a is arranged at a particular angular displacement relative to both the lens holder 204b and the image sensor 106. Specifically, the particular angular displacement of the lens 204a relative to both the lens holder 204b and the image sensor 106 is based on the clarity of the test chart images as analysed, For instance, the particular angular displacement of the lens 204a relative to both the lens holder 204b and the image sensor 106 can be defined as the position that provides the highest average clarity index of the various regions of interest 900a-e, as captured by the image sensor 106. Such optimisation of the relative angular displacement between the lens 204a and the image sensor 106 may be performed either in a single iteration or in multiple iterations.

After the step 506 of active alignment of the lens module 104 with the image sensor 106 is completed, the apparatus 100 performs the step 508 of UV curing to fix the arrangement of the lens module 104 and the image sensor 106.

The step 510 of offloading the assembled camera module is then undertaken by the apparatus 100. In this offloading step 510 the gripper 300 releases its grip on the lens module 104, and the unit transporter 108 then transfers the assembled camera module onto the on/offloading device 102 to await subsequent offloading from the apparatus 100. This completes one cycle of the assembly process. Depending on the number of camera modules to be assembled in each batch, the assembly process cycle continues until all the camera modules have been assembled before the entire batch of assembled camera module is offloaded from the apparatus 100.

It should be appreciated that modifications to the apparatus 100 are possible without departing from the scope and spirit of the invention.

For instance, instead of transferring a single lens module 104 and a single image sensor 106 within the apparatus 100 in each cycle of the assembly process, the unit transporter 108 may instead transfer multiple lens modules 104 and multiple image sensors 106 within the apparatus 100. This may advantageously improve the overall throughput capacity of the apparatus 100.

Figure 11:
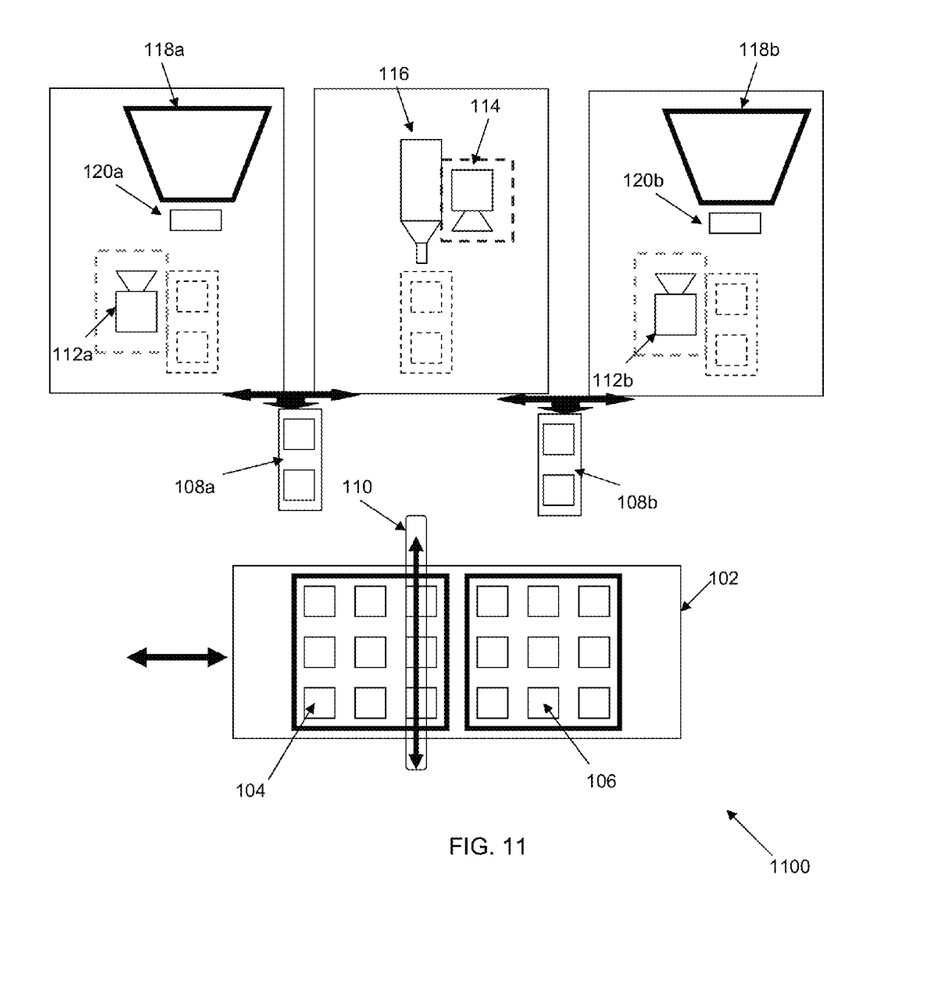
FIG. 11 is a schematic view of an apparatus according to a second embodiment of the invention.

In addition, FIG. 11 shows an apparatus 1100 of a second embodiment of the invention. In contrast to the apparatus 100 of the first embodiment of the invention, the apparatus 110 of the second embodiment includes two unit transporters 108a, 108b, two uplook inspection devices 112a, 112b, two active alignment devices 120a, 120b, and two image testing devices 118a, 118b. It should be noted that the various components of the apparatus 1100 operate in the same way as described above. However, the operation of the apparatus 1100 has to be suitably configured to maximise operational efficiency. For instance, when the unit transporter 108a is moving from the dispenser 116 to the active alignment device 120a for active alignment of the lens module 104 with the image sensor 106, the other unit transporter 108b can simultaneously transfer a new set of the lens module 104 and image sensor 106 to the dispenser 116 for dispensing UV glue. Advantageously, the apparatus 1100 can almost double its throughput capacity compared with that of the apparatus 100 according to the first embodiment.

The invention claimed is:

1. An apparatus for assembling a lens module and an image sensor to form a camera module, the apparatus comprising:
    a positioning system for adjusting a relative arrangement between the lens module and the image sensor;
    a test chart for use in testing optical characteristics of the lens module and the image sensor, the test chart comprising a plurality of regions of interest;
    a magnification lens assembly arranged between the test chart and the lens module; and
    an inspection system operative to view fiducials of the lens module and the image sensor,
    wherein the positioning system is operative to align the lens module and the image sensor based on a relative alignment of the respective fiducials of the lens module and the image sensor as viewed by the inspection system, and also based on a clarity of each of the regions of interest of the test chart as imaged by the image sensor.

2. The apparatus of claim 1, wherein the inspection system comprises a first inspection device positioned for viewing the fiducials on a surface of the lens module from a first direction, and a second inspection device positioned for viewing the fiducials on a surface of the image sensor from a second direction, the second direction being opposite to the first direction.

3. The apparatus of claim 1, wherein the positioning system comprises a gripper for gripping the lens module.

4. The apparatus of claim 3, wherein the gripper is configured to actuate the lens module to move in six degrees of motion defined by translational motion along each of three orthogonal axes in a three-dimensional space and rotational motion about each of the three orthogonal axes.

5. The apparatus of claim 3, wherein the gripper is configured to actuate the lens module to rotate relative to the image sensor about an axis defined by both the lens module and the image sensor, to align the respective fiducials of the lens module and the image sensor.

6. The apparatus of claim 1, wherein the positioning system comprises a unit transporter on which the image sensor is mountable for moving the image sensor within the apparatus.

7. The apparatus of claim 1, further comprising an optical diffuser for evenly distributing light from a light source to provide a diffuser background light, wherein the positioning system is operative to align a centre of the image sensor with a centre of the diffuser background light as obtained by the image sensor.

8. The apparatus of claim 1, wherein the test chart has length and width dimensions of not more than 15 cm.

9. The apparatus of claim 1, wherein the distance between the test chart and the imaging testing device is between 0.4 m and 5 m.

10. The apparatus of claim 1, further comprising a dispenser for dispensing UV glue onto the image sensor.

11. The apparatus of claim 10, wherein the apparatus is configured to cure the UV glue for fixing the relative arrangement between the lens module and the image sensor.

12. The apparatus of claim 1, wherein the positioning system is operable to locate the lens module at different positions along an axis along which the lens module and the image sensor are arranged, and the image sensor is operable to capture images of respective ones of the regions of interest of the test chart at each of those positions along the axis.

* * * * *